Aug. 12, 1958     R. L. JOOSTEN     2,847,340
METHOD OF ATTACHING A TEARING STRIP
KEY TO A CAN WALL
Filed Nov. 30, 1954

INVENTOR.
RICHARD L. JOOSTEN
BY *Charles H. Erne*
*Leland R. McCann*
*George W. Reiber*
ATTORNEYS United States Patent Office 2,847,340
Patented Aug. 12, 1958

2,847,340
METHOD OF ATTACHING A TEARING STRIP KEY TO A CAN WALL

Richard L. Joosten, Elmhurst, Ill., assignor to American Can Company, New York, N. Y., a corporation of New Jersey Application November 30, 1954, Serial No. 471,965

3 Claims. (Cl. 154—129)

The present invention pertains to a method of adhering a can opening key to a can body wall and the article formed by such method. More specifically this invention pertains to the cementing of a can opening key to a can body wall by means of two synthetic resin adhesives each having different adhesive characteristics.

A well known type of container having a wide spread use today is the so-called tearing strip container which is opened by means of a slotted key which engages and removes a portion of the circumference of the can that has been defined and weakened by score lines. It is the general practice to equip each such tearing strip can with an opening key preferably secured to the top end wall of the container. It is to the novel manner in which this key is affixed to the can that this invention is directed.

Presently, the usual methods of affixing the key to a can wall are by the spot welding or soldering of a portion of the key to subjacent metal of the can wall. However certain disadvantages are associated with these processes. Due to the thin gauge of metal wall to which the key is attached the localized high temperature which is inherent in these processes quite often burns through the metal making the can nonhermetic. This localized high temperature also has a tendency to char and degrade the metallic or organic coating on the inside and/or outside of the can wall, thereby exposing core metal which is subject to corrosion both from the atmosphere and from the contents packed in the container.

In an effort to obviate the disadvantages of spot welding or soldering the keys to the can walls while yet retaining the advantages of these methods, i. e. speed of effecting the bond and strength of the bond, attempts have been made to adhere the key to the can ends by means of resin adhesives. However, prior to the present invention no commercially satisfactory way of bonding the key and can parts together by means of organic adhesives has been found.

It is therefore an object of the present invention to provide a means of attaching an opening key to a can body wall without the danger of burning through the metal of the can.

Still another object of the present invention is to provide a means of joining an opening key with a can wall without affecting adversely the protective coating of the can.

A further object of the present invention is to provide an economical means of attaching an opening key to a can wall at a relatively high speed by means of an organic adhesive.

Still another object of the present invention is to provide a method of attaching an opening key to a can wall by means of two organic adhesives one of which produces a substantially permanent bond which maintains its strength over a wide range of temperatures and the other functions as an auxiliary adhesive for holding the key until the permanent bond is securely set.

Yet another object of the present invention is to provide a container wall having an opening key firmly attached thereto by means of an organic adhesive.

Numerous other objects and advantages of the invention will be apparent as it is better understood from the following description, which, taken in connection with the accompanying drawings, discloses a preferred embodiment thereof.

I have discovered that the above and other objectives can be accomplished by applying first a highly tacky, quick setting adhesive to the can wall, pressing the opening key into this first adhesive before it sets to hold the key firmly in place during subsequent operations; applying a second relatively fluid high strength slower drying adhesive to the key and subjacent can wall; and thereafter subjecting the assembly to a moderately elevated temperature to solidify or set the high strength adhesive.

Referring to the drawings.

Figure 1:
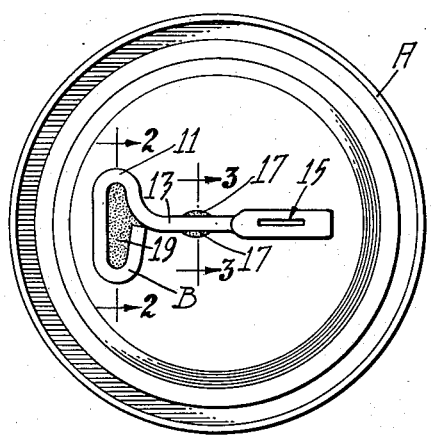
Figure 1 is a plan view of a can end and a key opener attached thereto in accordance with the present invention.
Figure 3:
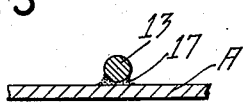
Fig. 3 is an enlarged section taken substantially along line 3—3 of Figure 1.

As a preferred or exemplary embodiment of the present invention Figure 1 illustrates a can end A having an opening key B attached thereto in accordance with the steps of the instant method invention. The opening key B comprises a loop or handle portion 11 and a shank portion 13, the end of which remote from the handle portion 11 contains a slot 15 for engaging and securing the tab or tongue of a tearing strip in a can body for the removal thereof in a well known manner. Partially surrounding the shank portion 13 intermediate its length is an adhesive 17 (Figs. 1 and 3).

Adhesive 17 is preferably applied to the can end A prior to its assembly with the key B. The primary function of this adhesive or cement is to hold key B in place on end B during subsequent treatment of the assembly. The strength with which the adhesive 17 bonds the key B to the end A need not be high since no great stresses are put upon the cement after it has initially bonded the key to the can end.

It has been found that a thermoplastic adhesive which has a relatively narrow softening range, e. g. 210° F. to 230° F., so as to rapidly and firmly bond the key to the end, such as hot melt materials, are well suited for purpose of the present invention. Examples of hot melt materials suitable for use as auxiliary adhesive 17 are paraffin wax, ethoxyline polymers, polyamide resins, polyvinyl butyral resins, isobutylene polymers, butyl methacrylate polymers, vinyl acetate polymers, terpene resins, fusible phenol-aldehyde resins, and vinyl acetate-vinyl chloride copolymers. Among the hot melt adhesives enumerated, the polyamides and isobutylene polymers are preferred.

The principal property desired in auxiliary adhesive 17 is the ability to set rapidly on cooling to a condition whereby key B is anchored against displacement from or movement on end A. However, adhesives having this property generally do not have sufficient strength over a large range of temperatures to be used as the sole or main bonding agent between can end A and key B, At low temperatures these materials become brittle and readily fracture when subjected to shock; while at elevated temperatures they tend to become soft and fail in cohesion. It is for this reason that it is necessary to use high strength cement or adhesive 19.

Figure 2:
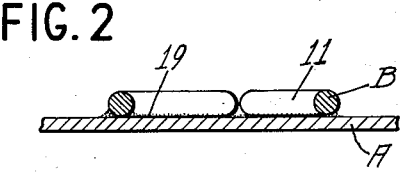
Fig. 2 is an enlarged section taken substantially along line 2—2 of Figure 1.

Cement 19 may be disposed within the enclosed area of loop 11 and secures loop 11 to the can end A (Figs. 1 and 2). Cement 19 is most advantageously applied in the form of a solution of synthetic resin adhesive in an organic solvent in which the solids are present in approximately 20% by weight of the entire solution. It is for this reason that the cement is applied in the enclosed portion of loop 11. The solution being relatively fluid flows out in a thin film over the surface of can end A enclosed by loop 11, and the interior periphery of loop 11 acts as a dam to prevent the solution from flowing freely out over an extended portion of the can end. However a small amount of the cement solution does flow under loop 11 forming a thin film between can end A and the loop 11 and terminating in fillets between the external portion of loop 11 and can end A as best seen in Figure 2. This limited flow or seepage is desirable since it increases the area of loop 11 bound to can end A thereby adding materially to the strength with which key B is held to the can end A.

Organic cement 19 is the principal bonding agent holding key B to can end A. When it has once solidified or set, cement 19 forms a very strong bond relatively unaffected by changes in temperature. Unfortunately solvent cut cements of this type, while having excellent adhesive and cohesive strength, require complete solvent evaporation before obtaining maximum strength. At practical operating temperatures, i. e. those having no adverse effects on the can lining enamel, the time required to evaporate this solvent is 5 minutes or longer. With present high speed production to hold the key and end quiescent during this extended length of time is completely unsatisfactory from a commercial standpoint. It is for this reason that it is necessary to use auxiliary cement 17 having the property of quick set so as to hold the key B in place on the can end A during the application and curing to maximum strength of cement 19.

Cement 19 can be made from a wide range of materials having the desired strength and solubility in organic solvents. Among these are vinyl polymers, such as vinyl acetate-vinyl chloride copolymers, vinyl acetate-vinyl chloride-maleic anhydride tripolymers, well known synthetic rubber adhesives such as butadiene-styrene copolymers, butadiene-acrilonitrile copolymers, rosins and rosin esters, terpenes such as beta pinene, coumarone-indene copolymers and phenol modified copolymers thereof and mixtures of any of the above enumerated synthetic resins. Of these high strength cements the combination of a vinyl copolymer and a synthetic rubber, specifically the combination of a vinyl chloride-vinyl acetate-maleic anhydride copolymer with a butadiene-acrylonitrile rubber is preferred for the high strength cement 19.

The solvent used with cement 19 is preferably a low boiling solvent so that it may readily be removed from the solution at only slightly elevated temperatures. Examples of such solvents are the low boiling ketones such as acetone, methyl ethyl ketone, methyl isopropyl ketone; low boiling esters such as methyl acetate and ethyl acetate; and propylene oxide.

Figure 5:
Fig. 5 is an enlarged sectional view taken substantially along line 5—5 of Figure 4.
Figure 4:
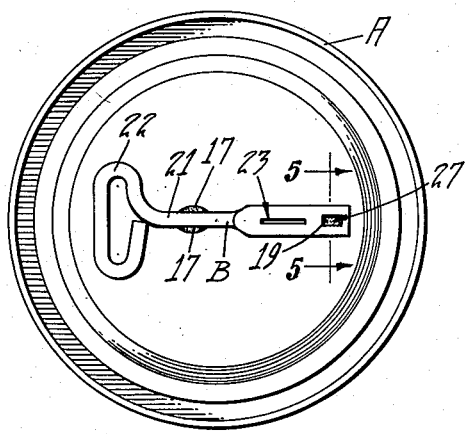
Fig. 4 is a plan view of a can end and a key opener attached thereto according to a modified form of the present invention.
Figure 6:
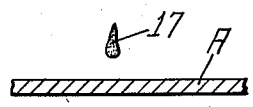
Figs. 6, 7, 8 and 9 are sectional views of a portion of a can end and a key and illustrating the sequence of steps in carrying out the preferred method of the present invention.
Figure 7:
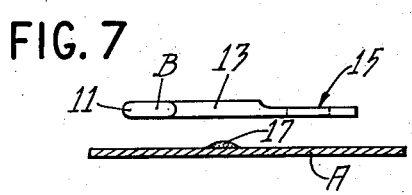
Figure 9:
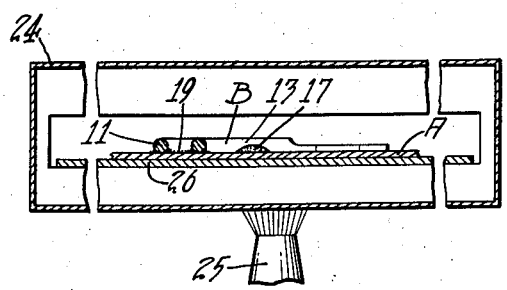
Figure 8:
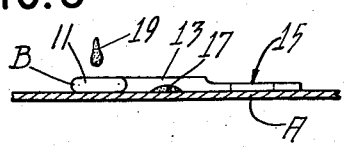

In the modified form of the present invention illustrated in Figures 4 and 5, a shank 21 of key B attached to can end A has a slot 23 for receiving the tongue of a tearing strip and terminates at its end remote from a handle or loop 22 in a slot 27. To provide room for the slot 27 shank 21 may be longer than shank 13 shown in Figure 1. Slot 27 provides an at least partially enclosed space in which to dispose the high strength cement 19 while the key B is held in place on end A by means of quick setting cement 17.

As with the structure shown in Figures 1 and 2 the fluidity of cement 19 while in solution allows it to spread throughout the aperture 27 and have a portion thereof flow between the shank 21 and the can end A and terminate in fillets around the outside edges of shank 21 (Fig. 5).

The slot or aperture 27 and the end in which it is disposed may be of any desired configuration. Slot 27 may be in any polygonal shape or round. The end in which it is disposed may be flattened and/or broadened so as to give a larger area of contact between shank 21 and the can end A to be cemented. If desired the shank 21 intermediate slot 27 and slot 23 may be weakened so that upon removal of key B from end A the key will break at this point rather than rupturing cement 19.

In the method of assembling key B to can end A (Figs. 6 through 9) a drop or gob of semi-fluid quick setting thermoplastic cement 17 is first applied to can end A in the center thereof. Although this gob of cement 17 may be disposed any desired place on the can end A, the preferred location of this cement centrally of the can end is found to minimize indexing problems, i. e. by placing the key B on the can end A so that the shank 13 or shank 21 extends along any diameter of can end A, the shank 13 or 21 is always brought into contact with the centrally placed gob of cement 17. After cement 17 has been deposited on can end A the key B is then pressed into adhesive 17 while the latter is still in a semi-fluid, tacky state. Due to its tackiness and the chilling effect of cold metal in both can end A and key B the cement 17 firmly holds key B onto can A and prevents the displacement of the key. While the key B is thus held in a stationary position the solution containing high strength cement 19 is then applied to both the can end A and the key B. This cement 19 may be applied either to the handle or loop portion 11 or as shown in the modified form in Figs. 4 and 5 to a slot or aperture 27 in the end of shank 21 remote from the handle portion 22. The complete assembly is then subjected to heat as by conveying the assembly on a belt 26, through an oven 24 heated in a suitable manner as by burner 25 to completely evaporate the solvent from the solution of cement 19 to cause the latter to solidify or set in a strong permanent bond.

The time required for the complete removal of solvent from cement 19 varies inversely with the degree of temperature used in the drying process. However the temperature used must not be so high as to cause softening of the cement 17 allowing the key to become loosened and displaced or to cause degradation of any can enamel used on the can end. To prevent undesirable thermal effects it has been found that the temperature of the baking process should be below 300° F. Satisfactory setting or solidification of cement 19 can be achieved by heating the assembled key and end at a temperature of 150° F. for 8 to 10 minutes.

With the procedure described above opening keys may be bonded to can body walls completely automatically and at speeds in excess of 150 a minute without in any way injuring the can end, the lacquer thereon or the key by the application of excess heat. Further, the keys attached to the can ends by the method of the present invention were not loosened or displaced by excessive handling or abuse at temperatures as low as 0° F. or above 100° F.

It is thought that the invention and many of its attendant advantages will be understood from the foregoing description, and it will be apparent that various changes may be made in the form, construction and arrangement of the parts and that changes may be made in the steps of the method described and their order of accomplishment without departing from the spirit and scope of the invention or sacrificing all of its material advantages, the form hereinbefore described being merely a preferred embodiment thereof.

I claim:
1. The method of attaching a metal opener to a metal can end, said opener having a shank portion intermediate its ends and an opening in one end, comprising heating a hot melt adhesive to a temperature above its softening point to render it tacky, applying said adhesive while tacky to a limited area of said can end, pressing said shank portion of said opener into said adhesive while said adhesive is in a tacky state to secure said opener against displacement relative to said can end, depositing a second adhesive dissolved in a volatile solvent to the assembled opener and can end in said opening in the end of said opener, and heating said assembled opener and can end to a temperature below the softening point of said hot melt adhesive to evaporate said volatile solvent to set said second adhesive while said opener is held against displacement by said hot melt adhesive.

2. The method set forth in claim 1 wherein said opening in one end of said opener consists of the area enclosed within a loop constituting the handle of said opener.

3. The method set forth in claim 1 wherein said opener has a looped handle at one end, an opening in the opposite end and a connecting shank portion therebetween.

References Cited in the file of this patent

UNITED STATES PATENTS

| | | |
|---|---|---|
| Re. 22,842 | Hill | Feb. 18, 1947 |
| 600,745 | Sands | Mar. 15, 1898 |
| 2,047,686 | Hodgson | July 14, 1936 |
| 2,532,166 | Hook | Nov. 28, 1950 |